United States Patent
Illsley et al.

(10) Patent No.: US 11,851,814 B2
(45) Date of Patent: *Dec. 26, 2023

(54) TEXTILE INKS

(71) Applicant: SUN CHEMICAL CORPORATION, Parsippany, NJ (US)

(72) Inventors: Derek Illsley, Derbyshire (GB); Paul Wallace, Derbyshire (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/025,712

(22) PCT Filed: Jul. 26, 2022

(86) PCT No.: PCT/GB2022/051950
§ 371 (c)(1),
(2) Date: Mar. 10, 2023

(87) PCT Pub. No.: WO2023/007142
PCT Pub. Date: Feb. 2, 2023

(65) Prior Publication Data
US 2023/0243095 A1    Aug. 3, 2023

(30) Foreign Application Priority Data

Jul. 30, 2021 (EP) .................................. 21188877
Aug. 31, 2021 (GB) .................................. 2112418

(51) Int. Cl.
| | |
|---|---|
| *D06P 5/30* | (2006.01) |
| *D06P 1/52* | (2006.01) |
| *D06P 5/20* | (2006.01) |
| *C09D 11/38* | (2014.01) |
| *D06P 3/54* | (2006.01) |
| *D06P 3/60* | (2006.01) |
| *C09D 175/04* | (2006.01) |
| *C09D 175/14* | (2006.01) |

(52) U.S. Cl.
CPC .............. *D06P 5/30* (2013.01); *C09D 11/38* (2013.01); *D06P 1/5285* (2013.01); *D06P 5/2083* (2013.01); *C09D 175/04* (2013.01); *C09D 175/14* (2013.01); *D06P 3/54* (2013.01); *D06P 3/6033* (2013.01)

(58) Field of Classification Search
CPC ........ D06P 5/30; D06P 1/5285; D06P 5/2083; D06P 3/54; D06P 3/6033; C09D 11/38; C09D 175/04; C09D 175/14
See application file for complete search history.

(56) References Cited

U.S. PATENT DOCUMENTS

| | | | | |
|---|---|---|---|---|
| 5,147,926 | A * | 9/1992 | Meichsner | C09D 11/102 524/839 |
| 7,476,705 | B2 * | 1/2009 | Pajerski | C09D 175/12 525/453 |
| 8,186,822 | B2 | 5/2012 | Li | |
| 9,074,103 | B2 | 7/2015 | Flores | |
| 9,221,984 | B2 | 12/2015 | Li | |
| 10,465,082 | B2 | 11/2019 | Ellis | |
| 2006/0264568 | A1 * | 11/2006 | Pajerski | C08G 18/0823 525/453 |
| 2014/0272141 | A1 * | 9/2014 | Kwan | C09D 11/17 427/256 |
| 2014/0313895 | A1 * | 10/2014 | Huber | H04L 47/10 455/452.2 |
| 2017/0355866 | A1 | 12/2017 | Ellis | |
| 2023/0242782 | A1 * | 8/2023 | Illsley | C09D 11/326 347/100 |

FOREIGN PATENT DOCUMENTS

| | | |
|---|---|---|
| CN | 101 240 101 A | 8/2008 |
| CN | 101240101 A | 8/2008 |
| CN | 101531848 B | 10/2011 |
| CN | 106243829 A | 12/2016 |
| JP | 2005256213 A | 9/2005 |
| WO | WO 2016/202654 A1 | 12/2016 |

OTHER PUBLICATIONS

International Search Report issued in International Application No. PCT/GB2022/051950, dated Nov. 7, 2022.
Written Opinion of the International Searching Authority issued in International Application No. PCT/GB2022/051950, dated Nov. 7, 2022.
Fangzhi Xuebao (2008), 29 (2), 68-72.

* cited by examiner

*Primary Examiner* — James M Mellott
(74) *Attorney, Agent, or Firm* — Luke Sande

(57) ABSTRACT

The present invention provides a method for providing a printed article, comprising printing an aqueous ink composition onto a fibrous substrate and curing the ink, wherein the ink composition comprises a polyurethane dispersion having the properties of (a) ketone or aldehyde groups present at one or more polymer chain ends; (b) a number average molecular weight ≤50,000 and; (c) the content of ketone and aldehyde groups is in the range 0.02 to 4.0 mmol g-1, based on the dry polymer weight. The present invention also provides use of said ink composition for printing onto a fibrous substrate.

17 Claims, No Drawings

TEXTILE INKS

CROSS REFERENCE TO RELATED APPLICATIONS

The present application is a § 371 National Phase application based on PCT/GB2022/051950 filed Jul. 26, 2022, which claims the benefit of GB Application No. 2112418.5, filed Aug. 31, 2021 and EP Application No. 21188877.1, filed Jul. 30, 2021, the subject matter of each of which is incorporated by reference in their entirety.

The present invention relates to a method for printing an aqueous ink composition onto a fibrous substrate (e.g., a textile substrate), wherein the ink composition comprises a polyurethane dispersion (PUD).

BACKGROUND OF THE INVENTION

JP2005256213A mentions that a textile fabric can be coated with various inorganic particles and then a coating layer containing a polymer binder with keto groups and a crosslinking agent can be applied to the surface to prepare a substrate for printing with an inkjet ink. The inorganic media used is silica and the polymers are acetoacetyl-modified poly(vinyl lactate). This relies on off-line treatment of the substrates prior to decoration and is not desirable.

Fangzhi Xuebao (2008), 29 (2), 68-72 mentions the use of a polyacrylate emulsion containing keto groups to reduce the formaldehyde loading in printed fabrics after curing in order to reach the strict standards for use in textile products for infants.

CN106243829A mentions that amongst other ink components, including at least 2-3 other polymer components, a keto-aldehyde modified acrylate resin can be used to promote binding and good wash resistance for traditional (non-inkjet) printing inks.

CN101240101A mentions that a hydrazine-terminated polyurethane emulsion can be prepared and mixed with an acrylate emulsion containing in-chain keto groups and the end polymer mixture used to coat textiles.

CN101531848B mentions how inkjet inks can be prepared containing either a self-crosslinking acrylic resin or a waterborne polyurethane resin, in combination with a softening agent and a pigment paste.

U.S. Pat. No. 9,221,984B2 describes the use of crosslinked pigment dispersions which can be used in aqueous textile inks for inkjet application.

U.S. Ser. No. 10/465,082B2 describes the use a pigment inkjet ink containing a pigment dispersion with a polyurethane dispersant and inclusion of a crosslinkable polyurethane binder with the aim of crosslinking the dispersion and the binder in the ink together once cured on a textile.

U.S. Pat. No. 8,186,822B2 mentions that inks containing a crosslinked polyurethane dispersoid binder additive can be reacted with selected diols to promote better washfastness on textiles.

U.S. Pat. No. 9,074,103B2 mentions an aqueous inkjet ink containing a urethane polymer or prepolymer as a binder but these are formed by reacting various polyisocyanates and not keto-terminated PUDs.

U.S. Pat. No. 7,476,705 mentions polymers incorporating crosslinkable groups, such as ketones, throughout the polymer chain. The issue with such PUDs is that, like conventional PUDs, they have poor resolubility and since a PUD molecule may comprise more than two ketone groups, they run the risk of producing a crosslinked dried polymer in a printhead when crosslinked with a multifunctional crosslinker, such as adipic dihydrazide ('ADH').

Unlike the documents cited above where there are keto-functional PUDs containing the keto-functionality in the polymer chain and not on the chain ends, the present invention relates to classes of PUDs that contain chain-terminal keto (or aldehyde) functionality. This is particularly important for this invention, as the chain ends are more accessible in terms of either anchoring to a fibrous substrate, preferably a textile substrate, or one of the other components of the inks and are not sterically congested. The prior art does not disclose the inclusion of keto-terminated polyurethane dispersants in textile inks.

This invention primarily differentiates from the background art in that the self-curing PUDs can undergo a variety of different chemistries and furthermore react by way of chain extension rather than a direct crosslinking mechanism. The terminal keto groups (or aldehyde groups) can undergo condensation reactions with primary amines, hydrazides, hydroxyl groups, aldol condensations, etc.

Citation or identification of any document in this application is not an admission that such represents prior art to the present invention.

SUMMARY OF INVENTION

The present invention provides a method for providing a printed article, comprising printing an aqueous ink composition onto a fibrous substrate and curing the ink, wherein the ink composition comprises a polyurethane dispersion having the properties of (a) ketone or aldehyde groups present at one or more polymer chain ends; (b) a number average molecular weight of ≤50,000 and; (c) the content of ketone and aldehyde groups is in the range 0.02 to 4.0 mmol $g^{-1}$, based on the dry polymer weight.

The present invention also provides use of an aqueous ink composition for printing onto a fibrous substrate wherein the ink composition comprises a polyurethane dispersion having the properties of (a) ketone or aldehyde groups present at one or more polymer chain ends; (b) a number average molecular weight of ≤50,000 and; (c) the content of ketone and aldehyde groups is in the range 0.02 to 4.0 mmol g-1, based on the dry polymer weight.

In a particularly preferred aspect of the invention, the groups present at one or more polymer chain ends are ketone groups. According, the ink composition used in the present invention preferably comprises a polyurethane dispersion having the properties of (a) ketone groups present at one or more polymer chain ends; (b) a number average molecular weight of ≤50,000 and; (c) the content of ketone groups is in the range 0.02 to 4.0 mmol $g^{-1}$, based on the dry polymer weight.

Unless stated otherwise, reference to the content of ketone and aldehyde groups is to the content of chain-end ketone and aldehyde groups.

The polyurethane dispersions (PUDs) used in the present invention are referred to herein as self-curing PUDs (SC-PUDs).

As will be understood, a group present at the polymer chain end is referred to as an "end-group", "chain end group" or "terminal group". This is different to a group being present on the polymer chain or as part of the polymer molecular structure, i.e., on the polymer backbone.

Preferably, the polyurethane is predominantly linear in structure, i.e., ≤5% of the polyurethane polymer chain contains a branched structure (based on the dry polymer weight). More preferably, the polyurethane is linear in structure.

The primary difference between the present invention and the background art is in the structure of the SC-PUDs. In the present invention, the SC-PUDs contain ketone or aldehyde chain end groups (i.e. terminal groups), preferably terminal keto-functional groups, and are able to undergo a wealth of different chemistries which has not been previously documented. Some examples of these are:

1. In the absence of a crosslinker in the ink, the keto-groups can undergo reaction with primary alcohols, for example those present on the surface of cotton and form hemiketals with the cotton surface.
2. In the absence of a crosslinker in the ink, the keto-groups can undergo reactions with amines, hydrazides or alcohols which are present as functional groups of certain colorant molecules, such as disperse red 60 (containing a primary amine and a phenolic hydroxyl group) or disperse yellow 54 (containing a phenolic hydroxyl group)
3. In the presence of a crosslinker such as a hydrazide, the components of the ink can bind together including the side reactions of primary alcohol containing co-solvents, such as glycols, colorants, and the textile fabrics themselves.
4. Where the SC-PUD contains hydroxyl groups on the backbone, there is a high likelihood that these hydroxyl groups could react with the functional groups of reactive dyes, such as monochlorotriazine or vinyl sulfone, to form a dye-SC-PUD covalent bond and then the chain-terminating keto groups on the SC-PUD could undergo reaction with the substrate or optional crosslinkers to bind the dye to the fabrics.
5. In the case of the SC-PUD which may contain acid-functional groups on the backbone, then these could interact with polyamide substrates and furthermore polyamide substrates could react to form imines with the terminal keto-functional SC-PUDs.
6. Under mildly basic conditions and at elevated temperatures during curing (e.g., 50° C. or greater), it is possible that the enolate ion formed from a keto-terminal end group could self-condense via an aldol reaction onto a neighbouring keto-group to again chain extend the polymer via a different mechanism.

As will be understood, the chain-terminated ketone (or aldehyde) functional polyurethane dispersions according to the present invention typically function as binders in ink compositions for textile printing. In this regard, incorporation of binders such as chain-terminated keto functional polyurethane dispersions into inks for textile printing have been found to be beneficial as they can bind the other components of the ink together and also bind firmly to various textile substrates without changing the hand or feel of the fabrics. Furthermore, the inks according to the invention were found to be completely washfast when cured.

Generally, there is a lack of suitable binders which can be used in the decoration of textiles with either dye-based or pigment-based inks. When trying to affix insoluble colorants to various textile fabrics, there is generally no direct bonding to the fabrics and the other components of the ink to deliver a total solution. Especially with pigment inks, the washfastness is generally quite poor. With dye-based inks, the washfastness is good, but this is because in the case of reactive, acid and direct dyes, the dye molecules themselves react to bind with cellulosic or polyamide fabrics. Even in these cases, during the post-printing treatment, up to 40% of the applied inks can be washed off the fabrics following curing.

The present invention incorporates a novel polyurethane dispersion having ketone or aldehyde groups at one or more of the polymer chain end(s) into the inks. The ketone or aldehyde (preferably ketone) groups at one or more of the polymer chain end(s) enables binding of the inks to a variety of substrates with different chemical surface functionality. For example, one pigment ink containing these novel PUDs can be used to bind to untreated cotton, polyester, polyamide or other textile fabrics having different surface chemistry functionality. The invention is further extended in that similar ink formulations can be used varying only the nature of the colorant, for example, switching a pigment for a disperse dye or even a reactive, acid or direct dye. It was found that in all cases, the degree of washfastness was greatly improved, the hand/feel of the textile fabric remained unchanged and the print quality was exceptional.

DETAILED DESCRIPTION

The inks containing the self-curing PUDs (SC-PUDs) can be used to anchor the ink components to various fibrous substrates (e.g., textile substrates) without needing any prior pre-treatment of the substrates (preferably textile articles). The invention is particularly beneficial for water-insoluble colorants such as pigments or disperse/solvent dyes. In these cases, pigments or disperse dyes as colorants in SC-PUD containing inks can be applied directly to non-primed textile substrates and thermally cured. The resulting decorated fabrics exhibit superior washfastness, excellent print quality, and most beneficially do not alter the hand or feel of the fabrics. Furthermore, the inks are shown to be resoluble such that if allowed to dry in printing head nozzle plates, the inks are readily re-dissolved and therefore do not cause any damage to print heads.

The novel keto-terminated polyurethane dispersions (SC-PUDs) disclosed herein provide a very suitable binder medium for digital textile inks. In the main, the industry has struggled with the fixation of the components of the ink chemically together with the textile substrates. In this invention, the novel materials, containing a terminal keto-group can be reacted via thermal curing with for example, hydroxyl-rich cotton substrates to liberate hemi-ketals under mildly acidic conditions. This anchors the SC-PUD chain to the substrate and the other unreacted keto-functionalities of the SC-PUD polymer chain end are then free to undergo reaction with the other ink components, such as crosslinking agents like hydrazides, other alcohols or even colorant molecules themselves to lock the components of the ink together to the surface of the cotton.

Similarly, anchoring of the same inks to other textiles substrates such as polyamide or polyester can also be effected without changing the SC-PUD. In the case of polyester, the reaction can occur between the keto-terminated SC-PUDs and the surface of the polyester via a crosslinker such as ADH. The same is also true for fabrics which are polyamide.

Furthermore, this invention can be extended to all colorants, such as pigments, insoluble dyes such as disperse or solvent dyes (insoluble in water) and finally even water-soluble dyes such as reactive, acid and direct dyes.

Finally, under mildly basic conditions and at elevated temperatures during curing (e.g., at 50° C. or greater), it is possible that the enolate ion formed from a keto-terminal end group could self-condense via an aldol reaction onto a neighbouring keto-group to again chain extend the polymer via a different mechanism.

Preferably, the ink compositions include at least one polymer material containing up to two keto-functional groups which are located at the chain ends of the polymer. This permits a high degree of flexibility in a relatively sterically unhindered series of chemical reactions to take place over and above those PUDs known in the art, which have keto-functionality contained throughout the backbone of the polymer chain. The inclusion of such SC-PUDs in the inks makes for a huge improvement in the anchoring of the ink film to a variety of different textile substrates and as a consequence vastly improves the washfastness of such inks when cured on various textile fabrics.

Preferably, the ink compositions may be, though are not limited to, inkjet ink compositions that can optionally include one or more additives that are compatible with the other components of the composition. Additives can be included in the composition to impart any number of desired properties, including, but not limited to, stability, smear resistance, viscosity, surface tension, coating penetration, optical density, color depth, adhesion, highlighter resistance, resolubility and crust resistance, among others. Suitable additives for such uses and the amounts of such additives used are known and conventionally used in the art.

The invention discloses the finding that aqueous printing inks having excellent resolubility/redispersibility but with the capacity to cure after printing to produce water resistant prints can be prepared through the use of a new class of self-curing polyurethane dispersion ('SC-PUD'). The inks of the invention are especially suited to inkjet printing where the excellent resolubility conferred by the technology reduces the risks associated with an ink becoming irreversibly dried into the nozzles of the printhead. The SC-PUDs used in the ink compositions of the invention comprise ketone or aldehyde groups located at the polymer chain ends. When these SC-PUDs are cured with a difunctional co-reagent such as a diamine or dihydrazide (adipic dihydrazide for instance) they can only cure to produce chain extended, higher molecular weight linear polymers. This unique feature distinguishes the inks of the invention from those where crosslinking chemistries are used. The crosslinking chemistries currently used in the art include self-crosslinking styrene-acrylic dispersions, self-crosslinking polyurethane dispersions. If allowed to dry and fully cure, these chemistries would produce potentially insoluble crosslinked polymer matrixes, which could pose issues for printing inks, and especially for inkjet.

In a further aspect of the invention, the SC-PUD used in the preparation of the printing inks may optionally comprise hydroxyl groups at the polymer chain end in addition to the ketone or aldehyde group. In this case the hydroxyl functionality may be incorporated through an end-capping reagent comprising both ketone (or aldehyde) and hydroxyl groups. In the case of the SC-PUD comprising hydroxyl groups it is preferred that the hydroxy value of the dry SC-PUD should preferably be less than 100, and more preferably less than 50 mgKOH/g.

The use of the SC-PUDs disclosed herein confers resolubility/redispersibility of the inks, which is an especially useful feature for aqueous inkjet printing inks. Resolubility/redispersibility, in the context of this invention and inkjet printing more broadly, can be described as the ability of an ink drying at temperatures up to 40° C., and even 50° C., for periods up to one hour (or more), to re-dissolve or redisperse into itself or a suitable 'flushing' solution. Inks comprising conventional PUDs, conventional self-crosslinking PUDs and styrene-acrylics typically have poor resolubility.

Inks having excellent resolubility can be prepared by using hydroxy-functional PUDs ('OH-PVDs'), but without any additional crosslinker these inks produce prints with poor water (wet rub) resistance. However, when crosslinkers are used to enhance the print resistance of inks comprising OH-PUDs, the ink resolubility is significantly compromised. The SC-PUDs disclosed herein overcome the problems associated with OH-PUDs. Indeed, inks comprising the SC-PUDs of the invention have been shown to have resolubility comparable to that achievable with inks comprising OH-PUDs combined with good water resistance.

Preferably, the ink compositions according to the invention do not comprise any carbodiimides (e.g., polycarbodiimides), oxazolines (e.g., poly oxazolines), azriridines (e.g., poly azriridines), epoxies, amino resins (such as melamine-formaldehhydes), isocyanates (e.g., blocked isocyanates) and/or silanes. More preferably, the ink compositions according to the invention do not comprise any polycarbodiimides.

Preferably, the inks used in the present invention are water-based. Unless stated otherwise, water-based inks comprise water in at least 20, at least 25, and at least 30% by weight. Preferably, the amount of water in the composition is 20 to 95% by weight, such as 20 to 80, and 30 to 70% by weight.

The ink compositions used in the present invention typically comprise a fluid carrier which preferably comprises water and one or more organic co-solvents, which can be water-soluble organic co-solvents, water-miscible organic co-solvents, or a combination thereof. The organic co-solvents can be added either alone or in combination. The organic co-solvents can in some instances enhance solubility of the components in the inkjet ink composition and facilitate penetration of a printed ink composition into a substrate. Preferably, the organic co-solvent is a water-soluble co-solvent.

Suitable water-soluble and water-miscible organic solvents include, but are not limited to, alcohols (e.g., methanol, ethanol, propanol, isopropyl alcohol, butanol, polyols, ethylene glycol, glycerine, and PEG, among others), ketones and ketone alcohols (e.g., acetone and diacetone alcohol, among others), ethers (e.g., tetrahydrofuran, dioxane, and alkylethers, among others), ethers of polyhydric alcohols (e.g., ethylene glycol monomethyl ether, ethylene glycol monoethyl ether, ethylene glycol monoethyl ether acetate, di(ethyleneglycol) monomethyl ether), nitrogen-containing solvents (e.g., 2-pyrrolidone, and N-methyl2-pyrrolidone, among others), sulfur-containing solvents (e.g., 2,2'-thiodiethanol, dimethylsulfoxide, tetramethylene sulfone, and sulfolane, among others), and sugars and derivatives thereof (e.g., glucose, oxyethylene adducts of glycerin, and oxyethylene adducts of diglycerin, among others).

For inkjet printing, the invention is exceptionally advantageous as the good resolubility will help to prevent the irreversible drying of inks in a printhead. If such irreversible drying of an ink in a printhead occurred it could lead to blocked nozzles and a consequent loss in print quality performance or, even worse, the loss of the printhead itself. So it can be seen that an ideal solution for an inkjet printing ink would be one that has good resolubility (with advantages of open time) yet at the same time being able to cure after printing and drying to produce water resistant prints. The invention achieves this without the use of excessive concentrations (i.e., greater than 35% w/w) of high boiling point co-solvents such as glycerol, diethylene glycol and propylene glycol. Indeed, the inventive inks maintain good resolubility/redispersibility with propylene glycol concentrations as low as 5.0% (w/w) of the ink composition.

Preferably, where any water-soluble organic solvent is used in the inks of this invention, it should preferably have a boiling point of less than 250° C., and more preferably less than 200° C. Where co-solvents having a boiling point in excess of 200° C., and especially in excess of 250° C., are used then they are used in less than 35% (w/w), more preferably less than 30% (w/w), and even more preferably 25% (w/w) or less. The use of such involatile solvents at concentrations often in excess of 35% (w/w) of the ink formulation is a commonly used approach for inkjet printing inks, not only to raise the viscosity of the ink but also to ensure that the ink has acceptable resolubility. However, the use of such high boiling point solvents has the associated disadvantage of causing slow drying times of the inks, which is undesirable for high throughput printing.

In a preferred aspect of the invention the concentration of organic water-soluble co-solvents is less than 35%, more preferably less than 30%, and even more preferably 25% (w/w) or less of the total ink composition. In a more preferred aspect of the invention the concentration of organic water-soluble co-solvents having heats of vaporization of 500 J/g, or greater, is less than 30%, and preferably 25% (w/w) or less of the total ink composition. In another preferred aspect of the invention, the concentration of organic water-soluble co-solvents having boiling points greater than 150° C. is less than 30%, and more preferably 25% (w/w) or less of the total ink composition, even more preferably the concentration of organic water-soluble co-solvents having heats of vaporization of 500 J/g, or greater, and boiling points greater than 150° C. is less than 30%, and more preferably 25% (w/w) or less of the total ink composition. Where such co-solvents are used, then any combination of solvents having boiling points of greater than 200° C., should preferably be less than 10% (w/w) of the ink composition, more preferably less than 5.0% (w/w).

The SC-PUD of the invention preferentially uses a difunctional amine or dihydrazide, such as adipic dihydrazide (ADH) to affect the curing by reaction with the terminal ketone or aldehyde groups on the polyurethane. However, it should be understood that the invention also incorporates polyfunctional amines, i.e., those bearing three or more primary amine groups.

The terminal ketone or aldehyde groups of the SC-PUDs used in the inks of the invention may also be cured via reaction with other co-reagents such as multivalent metal complexes, as disclosed in U.S. Pat. No. 7,947,760. Indeed, it is possible to cure inks comprising SC-PUDs by including in the ink compounds such as ammonium zirconium carbonate rather than the preferred diamine or dihydrazide.

The issue with using conventional PUDs by themselves in the preparation of aqueous inkjet ink compositions is that when they are dried at 40° C. for between 15 and 60 minutes they become largely insoluble in either the ink itself or a flushing solution. This issue is resolved by the current invention. Contrariwise, OH-PUDs, especially those having hydroxyl values of greater than 25 mgKOH/g, can produce inks having excellent resolubility/redispersibility, but which generally produce dried prints with poor water resistance. Again, this issue is resolved by the invention. Even if an ink dries on a faceplate of a printhead, and not within the body of the printhead and ink supply system this could be restricting. Printhead faceplates are often coated with what is termed a non-wetting coating ('NWC'). NWCs can be delicate structures comprising thin ceramic layers and to remove an insoluble residue from such a NWC could damage it, which would have consequences for print quality.

After printing and drying, the inks of the invention can develop their cure at ambient or elevated temperatures. The inventors have found that at ambient conditions (i.e., 22 to 25° C.) the cure of the inks can develop a day or more after printing. The cure of the inks can be accelerated by heating the prints at temperatures of 50° C. or greater. For most textile applications, where normal methods of fixation include steaming, this could be used alternatively as a fixation process. However, the inks are designed with sustainability and lower energy consumption in mind, so such high temperature steaming processes can be removed and lower temperature dry heat curing used.

There is no particular restriction on how the SC-PUD disclosed herein is prepared and it may be either anionically or non-ionically stabilized (or a combination of the two stabilization mechanisms), although anionically stabilized SC-PUDs are preferred.

When the SC-PUD is prepared, an end-capping reagent comprising a carbonyl group, in the form of a ketone or aldehyde, is used to attach the reactive curable functionality to the chain ends of the polymer. This end-capping reagent preferentially comprises a primary or secondary amine which reacts with isocyanate groups on the polyurethane precursor to form a urea linkage and hence forming the desired SC-PUD. The polyurethane precursor may be prepared from any blend of diisocyanates and diols, where the diols can include, but are not limited to polyester diols, polycarbonate diols, polyacrylic diols, polyether diols and any aliphatic or aromatic diol or any blend or hybrid thereof. Preferably, the diols used to prepare the polyurethane precursor do not comprise any ketone or aldehyde groups in their molecular structure. Diisocyanates used in the preparation of the SC-PUDs may be aliphatic or aromatic types including, but not limited to isophorone diisocyanate, hexamethylene-1,6-diisocyanate, methylene diphenyl diisocyanate, hydrogenated methylene diphenyl diisocyanate and toluene diisocyanate. Thus, the invention encompasses aromatic and aliphatic SC-PUDs. In the preparation of the polyurethane precursor, an excess of diisocyanate is used compared with the diol to leave the isocyanate functional prepolymer ready for end-capping with the carbonyl-functional reagent mentioned previously. An example of such an end-capping reagent includes:

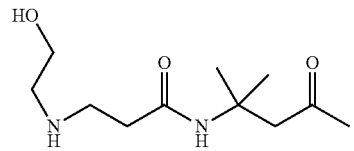 [SMILES: CC(=O)CC(C)(C)NC(=O)CCNCCO]

This end-capping reagent would introduce both a ketone and hydroxyl group to the terminii of the SC-PUD polymer.

Although the invention is preferably directed towards the preparation of linear SC-PUDs, it also encompasses the possibility of branched SC-PUDs, with the proviso that where the SC-PUD is branched there are at most two ketone or aldehyde groups at the polymer chain ends. Thus, as will be understood, where the SC-PUD is branched it is at most difunctional with respect to the reactive ketone or aldehyde functionality and does not comprise any aldehyde or ketone groups on the branches. The approaches for preparing such branched polyurethanes are well known and can be achieved, for example, through the use of trifunctional (e.g.

biuret HMDI trimers) isocyanates, trifunctional or higher functional polyols or trifunctional or higher functional primary and secondary amines. It should also be understood that the SC-PUDs may use difunctional amines in their synthesis to introduce urea linkages into the polyurethane backbone, which may further help the print resistance properties.

Where the SC-PUD is anionically stabilized, the SC-PUD comprises acid groups as part of its polymeric structure which after neutralization with a suitable base confer the anionic stabilization mechanism enabling its dispersion. Anionically stabilized SC-PUDs are commonly produced by the inclusion of a carboxylic acid into the polymer structure of the PUD. Typical reagents used to introduce carboxylic acid groups into the SC-PUD structure during its synthesis include dimethylpropiionc acid (DMPA). It should be understood that other diol reagents comprising one or more carboxylic acid groups may be used in the preparation of the SC-PUD. It is also possible that other acid-bearing reagents may be used in the preparation of the SC-PUD. Where DMPA or other acid-containing species is incorporated into the SC-PUD backbone then it may be neutralized with any organic or inorganic base to enable the anionic stabilizing mechanism. In the case of non-ionically stabilized SC-PUDs, a hydrophilic segment is incorporated as part of the polyurethane dispersion (such as a poly(ethylene oxide)) to enable its dispersion.

Where the SC-PUDs are anionically stabilized there is no restriction on the acid value of the SC-PUD although the acid value of the SC-PUD is typically between 0 and 100 mgKOH/g, based on the dry polymer weight of the PUD, preferably greater than 10 mgKOH/g, and more preferably greater than 20 mgKOH/g. Accordingly, it is preferred that the acid value, based on the dry polymer weight, should be at least 10, and more preferably at least 20 mgKOH/g. To disperse anionic SC-PUDs, any suitable base may be used including organic and inorganic types to neutralize the acid groups of the SC-PUD, enabling it to be dispersed in water. Non-limiting examples of bases used to neutralize the carboxylic acid (or other acids) of the SC-PUD include, but are not limited to triethylamine, N,N-dimethylethanolamine, any other tertiary amine, potassium hydroxide, sodium hydroxide. Where the neutralizing agent is a tertiary amine, it preferably has a boiling point greater than 125° C. Preferably, the neutralizing agent is N,N-dimethylethanolamine.

Dispersion of SC-PUDs may also be promoted by the use of anionic and non-ionic surfactants.

There is no restriction on the particle size of the SC-PUD used in the preparation of the inks of the invention. However, it is preferred that the average particle size should be less than 250 nm, and more preferably less than 100 nm.

There is no particular restriction on the total solid content contributed by the SC-PUD to the final aqueous (inkjet) printing ink composition. However, it is preferred that the total solid content contributed to the final ink formulation should be in the range 2.5% (w/w) to 40% (w/w), and more preferably in the range 5.0% (w/w) to 20.0% (w/w) of the final ink composition for inkjet compositions, based on the dry polymer weight.

Where the compositions of the invention are intended for inkjet printing, they should preferably have viscosities, at 32° C., of less than 10.0 mPa·s. as measured using a Brookfield DV-II+ Pro Viscometer equipped with Spindle no. 18, at 100 rpm.

The pH of the inks should preferably be in the range 5.0 to 10.0 and more preferably in the range 6.0 to 9.5.

For inkjet printing, the inks of the invention may be preferably printed onto any textile substrate which has not been previously pre-treated, such as untreated polyester or untreated cotton.

Alternatively, for decoration by inkjet printing, the inks may be printed onto textile substrates which have previously been pre-coated with a suitable pre-treatment composition to enhance the print quality. Such pre-treatments typically comprise a multivalent metal salt which helps to 'fix' the ink, reducing print quality issues such as drop spread and inter-color bleed. It should be understood that although pre-treatments do not form an integral part of the invention, any suitable pre-treatment enhancing the print quality achievable with the inventive inks may be used.

The benefits of using aqueous inkjet inks comprising the self-curing polyurethane dispersions described herein, especially for inkjet printing, are significant. In particular, the SC-PUDs disclosed herein enable compositions with an excellent balance of resolubility to be achieved that also produce prints on textiles with excellent wash resistance. This is achieved without the need of excessive concentrations of water-soluble solvents, otherwise known as humectants, such as propylene glycol and glycerol.

The inks of the invention are readily resoluble without recourse to the use of high concentrations of high boiling point solvents such as propylene glycol and glycerol. This is an important facet of the invention as it means that inks can be prepared with lower concentrations of such water-soluble co-solvents, whilst maintaining the desired resolubility, resulting in inks for inkjet printing textiles with a faster drying response. This will help the inkjet inks of the invention to serve the higher throughput industrial textile inkjet printing markets. Furthermore, the faster drying response achievable with inkjet inks of the invention will allow a reduction in the energy input required to dry them.

The SC-PUDs disclosed herein have pendant carbonyl groups, ketone or aldehyde, attached to at least one chain end of the polyurethane. Furthermore, the SC-PUD, based on the dry polymer weight, preferably contains at least 0.02 mmol of chain-end ketone or aldehyde groups per gram of SC-PUD (mmol(C=O) $g^{-1}$). The amount of chain-end ketone or aldehyde groups in the SC-PUD (on the dry polymer weight basis) is preferably in the range of 0.02 to 4.0 mmol $g^{-1}$, and more preferably in the range 0.05 to 2.0 mmol $g^{-1}$.

Self-crosslinking PUDs (and styrene-acrylics) are known in the art, and the keto-hydrazide crosslinking chemistry is well known and utilized in commercial products. The ketone, or aldehyde, groups in the polymer backbone which participate in this crosslinking reaction may be introduced into the PUD backbone by using a diol in the PUD manufacture that comprises a ketone group. This may be achieved by reacting a ketone-functional acid, such as levulinic acid, with a diepoxide to produce the desired ketone diol. Other approaches include the reaction of diacetone acrylamide with an alkanolamine such as diethanolamine. These self-crosslinking PUDs are different to the self-curing PUDs used herein in that a proportion of the polymer molecules will contain greater than two ketone or aldehyde groups as part of their molecular structure. When inks comprising the self-crosslinking PUDs described in the art are dried in the presence of a crosslinking co-reagent, such as adipic dihydrazide, they could react to form a crosslinked structure. Such a crosslinked polymer network in a drying or dry ink would have a detrimental impact on the resolubility/redispersibility of the ink and could potentially cause the irreversible blocking of the nozzles in an inkjet printhead.

Conventional (non-crosslinking) PUDs, such as Neorez R605, also have poor resolubility in terms of inkjet printing ink applications. This is probably due to the higher molecular weight of these polymers compared with the SC-PUDs used in the ink compositions of the invention and also of hydroxy-functional PUDs ('OH-PUDs'). The inventors have confirmed that inks comprising OH-PUDs do indeed have excellent resolubility. However, probably due to a combination of their hydroxyl content and low molecular weight (typically less than 15,000 number average molecular weight) the wash resistance of prints of inks on textiles comprising such OH-PUDs is deficient. Interestingly, the inventors have found with the new class of SC-PUDs disclosed herein, that although the presence of hydroxyl groups in the polymer structure can promote resolubility of an ink, it is not absolutely essential to conferring resolubility. Perhaps more importantly is the molecular weight of the PUD. In some preferred cases, the SC-PUD disclosed herein may have a number average molecular weight of less than 10,000 and even less than 5,000.

Based on the composition of the SC-PUD and knowing either the carbonyl (i.e. ketone or aldehyde) content or the hydroxyl value of the PUD enables a calculation of the number average molecular weight (essentially a chain end analysis). The weight average molecular weights have also been measured via gel permeation chromatography (GPC). It should be noted that in the determination of the molecular weight of the SC-PUD by GPC, this was done in the absence of any co-reagent of the self-curing chemistry, typically ADH.

The SC-PUDs used in the inks of the invention are preferably combined with a diamine or dihydrazide co-reagent, primary diamines and dihydrazides being preferred, to affect the curing of the SC-PUD once the ink is printed and dried. By combining the preferred difunctional SC-PUD (or in some cases monofunctional SC-PUD) with the difunctional amine or hydrazide co-reagent results in a curing process that proceeds without crosslinking, to produce a chain extended, linear, adduct of the SC-PUD and difunctional co-reagent. It is this differentiating feature of the SC-PUD that makes them especially suited for inkjet printing applications, but also for aqueous inks applied by flexographic and gravure printing. The curing process can progress at room temperature for up to 24 hours or more or can be accelerated by exposing the print to elevated temperatures, such as 50° C., or higher. Typical water-soluble multifunctional reagents which can cure the ketone (or aldehyde) end chain groups of the SC-PUD include but are not limited to adipic dihydrazide ('ADH'), pimelic acid dihydrazide any other dihydrazide derived from a difunctional acid, aliphatic di-, tri and higher functional amines. The latter may include polyethylene oxide comprising polyfunctional amines such as those supplied by Huntsman under the brand name 'Jeffamine'. It is also possible to cure ketone-containing PUDs using a polymer dispersion which comprises as part of its structure either primary or secondary amines. The ketone groups of the SC-PUDs may also be cured by using metal complexes, such as zirconium ammonium carbonate. However, difunctional amine and hydrazide co-reagents are the preferred choice for the reasons already outlined.

Metal complexes, such as ammonium zirconium carbonate ('AZC'), may be used to prepare self-crosslinking PUDs. Such metal complexes, present in the aqueous phase of the polymer dispersion, can react after the ink has been printed and dried, with carboxylic acid and carbonyl groups present in the PUD backbone. This has already been achieved for acrylic dispersions, as revealed in U.S. Pat. No. 7,947,760. Long shelf-life of the compositions, which can be an issue when using AZC, was achieved by using a stabilizer such as ammonium tartrate. This approach has not yet been taken for PUD chemistry. In this invention, the inventor has shown that addition of AZC to an ink comprising a SC-PUD (not containing any ADH) produced an ink having a degree of resolubility and washfastness, but not of the same order as was achievable with an ink comprising the same SC-PUD using ADH as the curing co-reagent.

Although not an essential feature, inks prepared according to the invention may also include any further water-soluble, alkali-soluble or water-dispersible resins, other than the SC-PUD. As will be understood, alkali-soluble resins typically comprise acidic functionality as part of the monomer blend that are capable of being neutralized with a suitable base such that the resin can be dissolved in water to form an aqueous solution. Additional resins include, but are not limited to polyurethane dispersions, self-crosslinking polyurethane dispersions, alkali-soluble acrylics, acrylic dispersions, self-crosslinking acrylic dispersions, polyester dispersions, poly(vinyl acetate) and copolymers of vinyl acetate dispersions, poly(vinyl alcohols), poly(vinyl pyrrolidones). It should be understood that one skilled in the art could modify inks prepared according to the invention through the addition of additional resins, but such modifications would fall within the spirit of the invention.

In an alternative aspect of the invention, the inks do not include any further water-soluble, alkali-soluble or water-dispersible resin, other than the SC-PUD. It may be the case that the inks of the invention do not include additional polyurethane dispersions (i.e., other than the SC-PUD), self-crosslinking polyurethane dispersions, alkali-soluble acrylics, acrylic dispersions, self-crosslinking acrylic dispersions, polyester dispersions, poly(vinyl acetate) or copolymers of vinyl acetate dispersions, poly(vinyl alcohols), poly(vinyl pyrrolidones), preferably the inks do not include any self-crosslinking acrylic dispersions.

There is no restriction on the total amount of resin binder that can be used in inks prepared according to the invention, but may be in the range 1.0% (w/w) to 40.0% (w/w), more preferably in the range 2.0% (w/w) to 30.0% (w/w) and most preferably, especially for aqueous inkjet printing inks in the range 2.5% to 20.0% (w/w) of the total ink composition, based on the dry combined weight of the SC-PUD and any other resins.

The inventor has also shown that inkjet inks prepared with SC-PUDs are resoluble in their varnish, that is the ink composition where the pigment dispersion was substituted with water. It is deemed that an ink that is resoluble in itself is highly advantageous as it will significantly reduce the risk of dried ink building up anywhere in or on the printhead, or in the ink supply system of an inkjet printing press, in particular. In the tests described later, a highly resoluble ink will rapidly redissolve/redisperse into the immersion fluid, typically within 2 to 5 minutes, whereas an insoluble ink would fail to redisperse in the soaking solution within 60 minutes of immersion.

The printing inks of the invention may optionally comprise any water-soluble organic co-solvent, according to what has previously been described. Although volatile solvents such as ethanol, propanol and isopropanol may be used, where the inks are intended for inkjet printing it is preferred that those which are not highly flammable or volatile should be used, typically a polyol, an alkylene glycol, an alkylene glycol ether or ether acetate type, with the following non-limiting examples: 4-hydroxy-4-methyl- 2-pentanone, diethyelene glycol, diethylene glycol butyl ether, diethylene glycol ethyl ether, diethylene glycol methyl ether, diethylene glycol monoethyl ether acetate, diethylene glycol monopropyl ether, dipropylene glycol, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, glycerol, propylene glycol, propylene glycol ethyl ether, propylene glycol ethyl ether acetate, propylene glycol methyl ether, propylene glycol n-propyl ether, triethylene glycol, triethylene glycol butyl ether, triethylene glycol methyl ether, tripropylene glycol, tripropylene glycol methyl ether, N-methyl pyrollidone, urea, and the like. As mentioned previously, it is preferred that where such co-solvents are used they should form less than 35% (w/w) and more preferably less than 30.0% (w/w) of the ink composition. Furthermore, it is preferred that the concentration of solvents having boiling points of greater than 250° C. should be less than 10.0% (w/w) and more preferably less than 5.0% (w/w) of the ink composition. In another preferred aspect of the invention the concentration of solvents having heats of vaporization greater than 500 J/g should be less than 30% (w/w) of the ink composition.

Examples of additives include, but are not limited to, defoamers, preservatives, surfactants, pH modifiers, viscosity modifiers, humectants, penetrating agents, and additional polymers, among others.

In another embodiment, defoamers can be included in the ink composition to inhibit the formation of foam. Examples of suitable defoamers include, but are not limited to, silicone-based or non-silicone defoamers. Commercially available defoamers include, but are not limited to, Dow Corning® 71 and Dow Corning® 74 (from Dow Corning), TegoAirex® 901W, 902W, 904W from Evonik Industries/Tega, Tergitol® L-61, L-62, L-64 and L-101 (from Dow Chemical). A typical amount (by weight) of defoamer included in the composition is 0.1 to 3% by weight.

In another embodiment, preservatives, such as biocides and fungicides, can be included in the ink composition to inhibit the growth of microorganisms. Examples of suitable preservatives include, but are not limited to, sodium benzoate, pentachlorophenol sodium, 2-pyridinethiol-1-oxide sodium, sodium sorbate, sodium dehydroacetate, benzisothiazolinone, 1,2-dibenzothiazolin-3-one, 1-(3-chlorallyl)-3, 5,7-triaza-1 azoniaadamantane chloride (CTAC), methylisothiazolinone, and chloromethylisothiazolinone, among others. Commercially available biocides include UCARCIDE® 250 (available from Union Carbide Company), Proxel® CRL, Proxel® BDN, Proxel® GXL, Proxel®XL-2, Proxel® TN (available from Arch Chemicals, Smyrna, Ga.), Dowicil® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.), and XBINX® (PMC Specialties Group, Inc., Cincinnati, Ohio). The preservatives may be used alone or in combination. A typical amount (by weight) of preservative included in the composition is 0.1 to 1.5% by weight.

In a further embodiment, surfactants can be included to reduce surface tension of the ink composition. The surfactant can be an anionic surfactant, non-ionic surfactant or cationic surfactant. Suitable surfactants can include, but are not limited to, those listed below and in U.S. Pat. Nos. 5,116,409, 5,861,447 and 6,849,111.

Exemplary surfactants are commercially available under various trade names, such as the PLURONIC® series (BASF Corporation, Parsippany, N.J.), TETRONIC® series (BASF Corporation, Parsippany, N.J.), ARQUAD® series (Akzo Chemical Inc., Chicago, Ill.), TRITON® series (Union Carbide Corp., Danbury, Conn.), SURFONIC® series (Texaco Chemical Company, Houston, Tex.), ETHOQUAD® series (Akzo Chemical Inc., Chicago, Ill.), ARMEEN® series (Akzo Chemical Inc., Chicago, Ill.), ICONOL® series (BASF Corporation, Parsippany, N.J.), SURFYNOL® series (Air Products and Chemicals, Inc. Allentown, Pa.), and ETHOMEEN® series (Akzo Chemical Inc., Chicago, Ill.), among others. The surfactants can be used alone or in combination. A typical amount (by weight) of surfactant included in the composition is 0.1 to 10% by weight.

In a further embodiment, pH modifiers can be included to adjust or buffer the ink composition to a desired pH. Suitable pH modifiers include, but are not limited to, alkali hydroxides, alkali carbonates and bicarbonates, triethylamine, dimethylethanolamine, triethanolamine, mineral acids, hydrochloric acid, and sulfuric acid, among others. The pH modifiers can be used alone or in combination. A typical amount (by weight) of pH modifier in the composition is 0.1 to 2% by weight.

In another embodiment, the ink composition can include one or more viscosity modifiers. Examples of suitable viscosity modifiers include, but are not limited to, resin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic and starch, hydrophobic ethoxylated urethanes (HEURs), hydrophobically modified alkali swellable emulsions (HASEs), alkali swellable emulsions (ASEs), among others. The viscosity modifiers can be used alone or in combination. A typical amount (by weight) of viscosity modifier in the composition is 0.5 to 10% by weight.

In another embodiment, in addition to an organic cosolvent of the fluid carrier component which can function as a humectant, one or more additional humectants can be included in the inkjet ink composition to reduce the rate of evaporation of the water component and prevent an ink composition from drying out in the nozzles of the printhead, which can occur during periods of latency, to minimize clogging of the nozzles. Humectants can be selected from materials having high hygroscopicity and water-solubility. Examples of suitable humectants include, but are not limited to, polyols (e.g., glycerol, ethylene glycol), alcohol ethers (e.g., diethylene glycol, triethylene glycol), lactams (e.g., 2-pyrrolidone, urea compounds such as urea, 1,3-dimethylimidazolidinone), saccharides (e.g., sorbitol), 1,4-cyclohexanedimethanol, 1-methyl-2-piperidone, N-ethylacetamide, 3-amino-1,2-propanediol, ethylene carbonate; butyrolacetone and Liponic EG-1, among others. There are no particular limitations on the amount used of the humectant. A typical amount (by weight) of humectant in the composition is 0.5 to 30% by weight.

In another embodiment, penetrating agents can be included to reduce bleeding of an ink composition when applied to a print substrate such as paper, among others. Examples of suitable penetrating agents include, but are not limited to, alkyl alcohols having 1 to 4 carbon atoms (e.g., ethanol), glycol ethers (e.g., ethylene glycol monomethyl ether), diols (e.g., 1,2-alkyl diols), formamide, acetamide, dimethylsulfoxide, sorbitol and sulfolane, among others. The penetrating agents may be used alone or in combination. A typical amount (by weight) of penetrating agents in the composition is 1 to 20% by weight.

In another embodiment, the ink composition can optionally include additional polymers (other than the water-soluble poly(styrene-maleic acid) co-polymer) to enhance water-fastness, rub and light fastness of an ink image applied to and dried on a print substrate. Examples of such polymers include, but are not limited to, polyvinyl alcohols, polyesters, polyestermelamines, styrene/acrylic acid copolymers, styrene/maleic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, among others. Such additional polymers can be used alone or in combination. A typical amount (by weight) of such additional polymers that can be included in the composition is 0.1 to 20% by weight.

In another embodiment, the ink composition can optionally include a self-crosslinking polymer to improve the durability of an ink image applied to and dried on a print substrate. Examples of such self-crosslinking polymers for use in the ink compositions include, but are not limited to, self-cross-linking acrylic polymers, styrene-acrylic copolymers, styrene-butadiene latexes, styrene-isoprene latexes, acrylonitrile-butadiene latexes, alkyd dispersions, vinyl polymers, silicone dispersions, polyamide dispersions, chlorinated olefin dispersions, and polyester dispersions, among other self-crosslinking polymers. Such self-crosslinking polymers can be used alone or in combination. A typical amount (by weight) of such self-crosslinking polymers that can be included in the composition is 0.1 to 20% by weight.

Other additives that can be included in the ink compositions include, but are not limited to, antioxidants, ultraviolet absorbers, chelating agents, electric conductivity adjusters, oxygen absorbers, anti-kogation agents, anti-curling agents, and fragrances, among others. The amounts of such additives for use in aqueous inkjet ink compositions are known and conventionally used in the art.

Preferably, the ink composition of the invention comprises one or more colorants such as dyes or pigments.

Suitable colorants that can be used in the ink composition of the invention include inorganic and organic pigments and lake dispersions. Pigments refer to a colorant particle that is typically water insoluble. Suitable pigments that can be used to form the ink compositions disclosed herein may include any organic or inorganic pigment known in the art, including, but not limited to, black, yellow, orange, brown, red, violet, blue, green, fluorescent, metal powder and polymer bond pigments. Pigments also may include, but are not limited to, carbon black, azo pigments, phthalocyanine pigments, anthraquinone pigments, perylene and perynone pigments, polycyclic pigments, naphthol pigments, anthrapyrimidone pigments, quinacridone pigments, anthanthrone pigments, flavanthrone pigments, thioindigo pigments, dioxazine pigments, isoindoline and isoindolinone pigments, quinophthalone pigments, azine pigments, nitroso pigments, nitro pigments, triphenylmethane lake pigments, ovaine lake pigments, metal complex pigments, natural pigments, and inorganic pigments, among others. The pigment particles should be sufficiently small to permit free flow of the ink through the ejecting nozzle of an inkjet printing device.

Suitable colored pigments can include, for example, yellow pigments such as C. l. Pigment Yellow 1, 2, 3, 4, 5, 6, 10, 12, 13, 14, 16, 17, 24, 55, 61, 65, 73, 74, 81, 83, 93, 94, 95, 97, 99, 100, 108, 109, 110, 117, 120, 123, 124, 128, 129, 133, 138, 139, 147, 150, 151, 153, 154, 155, 156, 167, 168, 172, 173, 174, 175, 176, 177, 179, 180, 181, 182, 183, 184, 185, 187, 188, 190, 191, 192, 193, and 194 among others; red pigments such as, C. l. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48, 49, 50, 51, 52, 53, 55, 60, 64, 68, 81, 83, 87, 88, 89, 90, 95, 112, 114, 119, 122, 123, 136, 144, 146, 147, 148, 149, 150, 151, 163, 164, 166, 168, 169, 170, 161, 172, 175, 176, 202, 204, 206, 207, 210, 211, 212, 213, 214, 216, 220, 222, 237, 238, 239, 240, 242, 243, 245, 247, 248, 251, 252, 253, 254, 255, 256, 258, 261, and 264 among others; violet pigments such as C. l. Pigment Violet 1, 2, 3, 5, 13, 19, 23, 25, 27, 29, 31, 32, 37, 39, 42, 44, and 50 among others; blue pigments such as C. l. Pigment Blue 1, 2, 3, 9, 10, 14, 15, 16, 18, 19, 21, 22, 24, 25, 56, 60, 61, 62, 63, 64, 65, and 66, among others; orange pigments such as C. I. Pigment Orange 1, 2, 5, 6, 7, 13, 14, 15, 16, 17, 19, 22, 24, 31, 34, 36, 38, 40, 42, 43, 44, 46, 48, 49, 51, 59, 60, 61, 62, 63, 64, 65, 66, 67, 68, and 69 among others; green pigments such as C. l. Pigment Green 1, 2, 4, 7, 8, 10, 34, 36, 45, and 47, among others; brown pigments such as C. l. Pigment Brown 1, 2, 3, 5, 22, 23, 25, 26, 32, 38, 41, and 42 among others; black pigments such as C. l. Pigment Black 1, 7, 20, 31, and 32 among others, and white pigments such as titanium dioxide. Commercially available colored pigments may include, for example, Pigment Red 122 and Pigment Violet 19 (available from Lansco Colors, Montvale, N.J.). or BASF Color, Charlotte, N.C. or Clariant Colors, Charlotte, N.C. or Sun Chemical, Cincinnati, Ohio), Pigment Blue 15:1 (available from Fanwood Chemical, Fanwood, N.J.), Pigment Blue 15:3, Pigment 15:4, Pigment Yellow 74 and Pigment Yellow 97 (available from BASF Color, Charlotte, N.C. or Clariant Colors, Charlotte, N.C. or Sun Chemical, Cincinnati, Ohio), among others. Other suitable pigments may include, but are not limited to Disperse Blue 14, Disperse Blue 19, Disperse Blue 72, Disperse Blue 334, Disperse Blue 359, Disperse Blue 360, Disperse Orange 25, Disperse Yellow 54, Disperse Yellow 64, Disperse Red 55, Disperse Red 60, Macrolex Red H, Disperse Brown 27, Solvent Blue 67, Solvent Blue 70, Solvent Red 49, Solvent Red 146, Solvent Red 160, Solvent Yellow 162, Solvent Violet 10, and Solvent Black 29, among others.

Suitable dyes for this invention which are water soluble include but are not limited to reactive dyes such as Monochlorotriazine class (MCT) or Vinyl sulfone class (VS) for example, Reactive Yellow 95, Reactive Orange 12, Reactive Orange 13, Reactive Blue 49, Reactive Blue 15, Reactive Red 3:1, and Reactive Black composite mixtures. Other suitable dyes which are water soluble from the Acid dyes class include, but are not limited to, Acid Red 249, Acid Red 131, Acid Blue 185, Acid Yellow 79 and Acid Black composite mixtures. Direct dyes include but are not limited to Direct Black 19, Direct Black 168, Direct Yellow 50, Direct Red 9, Direct Red 80 and Direct Brown 116.

Suitable pigments can also include carbon black, which is the generic name for carbon particles derived from the thermal decomposition or the incomplete combustion of natural gas and hydrocarbons, such as aromatic oils on coal tar basis, mineral oils, coal tar distillate, and acetylene. More than 100 individual grades of carbon black are available on the market today, each with its own distinctive set of characteristics and properties. Any acidic carbon black, neutral carbon black and alkaline carbon black can be used. This includes channel blacks, gas blacks, lamp blacks, thermal blacks, acetylene blacks and furnace blacks. More particularly, suitable carbon blacks include channel blacks. Examples of commercially available carbon blacks include, but are not limited to, those available from Cabot (Elftex 8, Black Pearls® 490, Black Pearls® 120, Monarch® 120, Monarch® 700, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R, Cab-O-Jet® 200, Cab-O-Jet® 300, and Cab-O-Jet® 400), Degussa/Orion Carbon (NlPex® 150 IQ, NlPex® 150, Printex® 55, Printex® 80, Printex® 90, Printex® A, Printex® G, Printex® U, Printex® V, Printex® 140U, Printex® 140V, Purex® LS 35, Corax® HP 160, Thermal Black N 990, NlPex® 160 IQ, Nipex® 1701Q, Nipex® 1801Q, NlPex®

90, Special black 4, Special black 4A, Special black 5, Special black 6, Special black 100, Special black 250, Color black FW1, Color black FW2, Color black FW2V, Color black FW18, Color black FW200, Color black S150, Color black S160 and Color black S170), Columbian/Birla Carbon (Raven® 780, Raven® 5000 Ull, Raven® 1255, Raven® 2500 U, Raven® 3600 U, Raven® 3500, Raven® 5000, Raven® 7000, Raven® 1220 and Raven® 1225), Mitsubishi Kagaku K. K. (MA8, MA11, MA77, MA100, MA220, MA230, MA600, MCF88, #10B, #20B, #30, #33, #40, #44, #45, #45L, #50, #55, #95, #260, #900, #970, #1000, #2200B, #2300, #2350, #2400B, #2650, #2700, #4000B and CF9), Orient Chemical Industries Ltd. (Bonjet Black CW-1, US 2018/0105710A1 Bonjet Black CW-2, and Bonjet Black CW-3) and Sensient Technologies (Sensijet® Black SDP100, Sensijet® Black SDP1000, and Sensijet® Black SDP2000.

In another embodiment, the pigment can be self-dispersing in a selected continuous phase. Self-dispersing pigments are pigments that do not require an additional dispersant for being stable within a polymer composition. In some embodiments, a self-dispersing pigment is a pigment that has been functionalized with a dispersing agent such as a molecule containing a hydrophilic functional group, for example, by covalent bonding of the molecule to the surface of the pigment.

In another embodiment, the amount (by weight) of the colorant in the inkjet ink compositions is at least 0.1, such as at least 0.5, at least 1, at least 1.5, and at least 2, % by weight. In embodiments, the amount of the colorant is at most 10, such as at most 9, at most 8, at most 7, at most 6, and at most 5% by weight. This includes embodiments in which the amount of the colorant in the compositions is 0.1 to 10% by weight, such as 2 to 5% by weight.

A colorant used in the inventive inkjet ink compositions can comprise one or more embodiments described herein.

Methods of Printing and Substrates

The invention provides methods of printing an image on a fibrous substrate by applying an aqueous ink composition disclosed herein onto the substrate. The invention also provides a method for providing a printed article, comprising printing an aqueous ink composition disclosed herein onto a fibrous substrate and curing the ink. Preferably, the ink compositions disclosed herein are adapted for use with an inkjet printing apparatus.

In the method of printing an image according to the invention, droplets of an inkjet ink composition as disclosed herein are ejected from a small nozzle of a printhead and deposited onto a print substrate to generate an image thereon. Suitable inkjet ink printing apparatus can include, but are not limited to, Drop-on-Demand Valve (DoD Valve), MEMS technology and Drop-on-Demand PiezoElectric (DoD Piezo).

As used herein, a fibrous substrate is a material that is composed from fibres, which may be natural fibres or synthetic fibres. Preferably, the fibrous substrates that are suitable for use in the present invention are made from natural fibres such as cellulose or protein (e.g. collagen) fibres. Preferably, the fibrous substrate is composed from natural fibres and is selected from wood (e.g. fiberboard), paper (e.g. wallpaper or cardboard), leather, silk, cotton, wool (e.g. merino wool or cashmere), hemp, ramie, sisal, bamboo, flax or blends of the same.

As will be appreciated in the art, wood, cotton, hemp, ramie, sisal, bamboo and flax comprise cellulose fibres and can therefore be referred to as cellulosic substrates. However, the present invention is not limited to natural cellulosic substrates and also includes synthetic cellulosic substrates such as rayon. As used herein rayon substrates include viscose rayon, modal rayon acetate rayon and lyocell rayon.

As will be understood in the art, the term "fibrous" used in connection with cellulosic substrates does not refer to polymeric cellulosic chains, but instead to the fibres formed by multiple polymeric cellulosic chains which are bound together by intermolecular forces between chains to form cellulose fibres comprising many tens of polymer chains as, for instance, found in naturally occurring cellulosic fibre such as cotton.

Preferably, the fibrous substrate is a textile. As will be understood in the art, textiles are formed from weaving, knitting, crocheting, knotting, tatting, felting, bonding and/or braiding yarns, which themselves are formed from fibres. Preferably, the textile is a non-woven textile. The textile substrates suitable for use in the present invention may be formed from or are any one or more of the fibres described herein. For example, the textile substrates suitable for use in the present invention may be selected from cotton, rayon, silk, polyester, PET (Polyethylene terephthalate), viscose, nylon, polyamide, canvas, cashmere, chenille, chiffon, crepe, damask, georgette, gingham, jersey, lace, linen, polyvinyl chloride, leather, merino wool, modal, muslin, organza, satin, spandex, suede, taffeta, toile, tweed, twill, velvet, wallpaper and combinations thereof. Preferably, the textile substrate suitable for use in the present invention can be formed from or is cotton, rayon, silk, polyester, PET (Polyethylene Terephthalate), viscose, spandex, polyamide, nylon, leather, wool (e.g. merino wool), hemp, ramie, sisal, bamboo, flax, PVC (Polyvinyl Chloride) or blends thereof. More preferably, the substrates suitable for use in the present invention are selected from cotton, polyester, polyamide and combinations thereof.

Preferably, the substrate used in the present invention does not contain a chemical primer or chemical pre-treatment layer on its surface, and so the ink is printed directly onto the substrate. As will be understood in the art, a chemical primer layer is an intermediary layer between the substrate and the ink that facilitates adhesion between the substrate and the ink. Similarly, it will be understood in the art that chemical pre-treatment of a substrate involves applying a chemical substance to the substrate before printing which binds to the substrate and which facilitates adhesion between the substrate and the ink. As used herein, an untreated substrate (e.g. untreated cotton) refers to a substrate that does not contain a chemical primer or chemical pre-treatment layer on its surface.

As will be understood in the art, a chemical primer or chemical pre-treatment is distinct from a physical pre-treatment of the substrate. Accordingly, the substrate suitable for use in the present invention may be subjected to a physical pre-treatment prior to being printed, for example a plasma pre-treatment.

Measurement Methods

Boiling point: Unless stated otherwise, all boiling points are measured under standard atmospheric pressure of 101 kPa.

Heat of Vaporization: This is defined as the amount of energy (enthalpy) that must be added to a liquid substance to transform a quantity of that substance into a gas. For the purposes of the present disclosure, the enthalpy of vaporization is given at the normal boiling temperature of the substance in question, wherein the normal boiling point is the boiling point of a substance at one atmosphere pressure.

As used herein, room temperature is 25° C.

Unless stated otherwise, solubility is measured at 25° C.

Hydroxyl Value (OHV): This is defined as the number of milligrams of potassium hydroxide required to neutralize the acetic acid taken up on acetylation of one gram of a chemical substance that contains free hydroxyl groups. The hydroxyl value is suitably measured in accordance with the ISO 4629-1:2016(E).

Acid Value (AV): The mass of potassium hydroxide (KOH) in milligrams that is required to neutralize one gram of chemical substance. Unless stated otherwise, reference to the acid value is to the total acid value and is suitably measured in accordance with ISO 2114:2000(E) (method B) standard.

Molecular weight: References to both number average molecular weight and weight average molecular weight are made throughout. Number average molecular weight and weight average molecular weight are determined using gel permeation chromatography (GPC). Preferably, molecular weight is measured by comparison with a polystyrene standard. For instance, molecular weight determination may be conducted on a Hewlett-Packard 1050 Series HPLC system equipped with two GPC Ultrastyragel columns, 103 and 104 Å (5 μm mixed, 300 mm×19 mm, Waters Millipore Corporation, Milford, MA, USA) and THF as mobile phase. The skilled person will appreciate that this definition of molecular weight applies to polymeric materials which typically have a molecular weight distribution. In the experimental work performed herein, theoretical number average molecular weight was calculated by end-group analysis (also referred to as chain end analysis) based on the carbonyl (i.e. ketone and/or aldehyde) content and the mass of the polymer and assuming carbonyl groups are present at each of two chain ends of the polymer.

Carbonyl content: Carbonyl content (i.e. ketone and/or aldehyde content) is preferably measured using quantitative $^{13}C$ NMR spectroscopy. Preferably, carbonyl content is measured by comparison with a suitable calibration reagent, e.g., the end-capping reagent used to prepare the SC-PUD. For instance, a calibration curve can be prepared by running a number of $^{13}C$ NMR experiments of known concentrations of end-capping reagent and integrating a specific carbon peak on the NMR spectra, e.g. the carbonyl peak. The same carbon integral of the polymer being investigated can then be compared to the calibration curve to provide the carbonyl content of the polymer. In the experimental work performed herein, carbonyl content is calculated from the number of moles of feedstock materials used to manufacture the SC-PUD.

Particle size/average particle size. Unless stated otherwise, the terms "particle size" or "average particle size" refer to the volume distributed median particle diameter (equivalent spherical diameter corresponding to 50% of the volume of all the particles, read on the cumulative distribution curve relating volume % to the diameter of the particles—often referred to as the "D(v,0.5)" value). Particle size is preferably measured by laser light diffraction.

Nanoscale: In the context of the invention this refers to a particle having one dimension of less than 100 nm, a commonly accepted definition of a nanoparticle.

Polydispersity: Polydispersity (or polydispersity index) as used herein is a measure of the heterogeneity of a sample based on particle size. Unless stated otherwise, polydispersity was measured using a using a Malvern Zetasizer Nano-S particle size analyzer from Malvern Instruments.

Unless stated otherwise, pH was measured at 25° C. using an Oakton 510 series pH meter.

Unless stated otherwise, dynamic surface tension is measured using a SITA bubble pressure tensiometer at 25° C. and 2.7 Hz and static surface temperature is measure using a SITA bubble pressure tensiometer at 25° C. and a bubble frequency of 0.025 Hz.

As will be understood by the skilled person, the terms resolubility and redispersibility are used interchangeably in the art to refer to the same ink property, namely resolubility.

The present invention has been described in detail, including the preferred embodiments thereof. However, it will be appreciated that those skilled in the art, upon consideration of the present disclosure, may make modifications and/or improvements on this invention that fall within the scope and spirit of the invention.

NUMBERED PARAGRAPHS OF THE INVENTION

The invention is further described by the following numbered paragraphs.

1. A method for providing a printed article, comprising printing an aqueous ink composition onto a textile substrate and curing the ink, wherein the ink composition comprises a polyurethane dispersion having the properties of (a) carbonyl groups present at one or more polymer chain ends; (b) a number average molecular weight ≤50,000 and; (c) the content of carbonyl groups is in the range 0.02 to 4.0 mmol g-1, based on the dry polymer weight.
2. The method of numbered paragraph 1, wherein the polyurethane dispersion has a number average molecular weight ≤25,000.
3. The method of numbered paragraph 1 or 2, wherein the substrate is selected from the group consisting of cotton, rayon, silk, polyester, PET (Polyethylene terephthalate), viscose, nylon, polyamide, canvas, cashmere, chenille, chiffon, crepe, damask, georgette, gingham, jersey, lace, linen, polyvinyl chloride, leather, merino wool, modal, muslin, organza, wood, satin, spandex, suede, taffeta, toile, tweed, twill, velvet, wallpaper and combinations thereof.
4. The method of any preceding numbered paragraph, wherein the method of printing is inkjet.
5. The method of any preceding numbered paragraph, wherein the substrates do not contain a chemical primer or chemical pre-treatment layer.
6. The method of any preceding numbered paragraph, wherein the ink is printed onto a base coat of a white or other coloured pigment or dye.
7. The method of any preceding numbered paragraph, wherein the printing ink is subsequently overprinted with a topcoat.
8. The method of any preceding numbered paragraph, wherein the ink is cured using a near infrared (NIR) lamp or infrared lamp.
9. The method of any preceding numbered paragraph, wherein the ink is cured using a thermal method at between 30-250° C.
10. The method of any preceding numbered paragraph, wherein the ink is cured using an airflow method.
11. The method of numbered paragraph 4, comprising an inkjet printing head selected from the group consisting of thermal, drop-on-demand, continuous or MEMS.
12. A printed image resulting from one or more of the methods of numbered paragraphs 1-11.

EXAMPLES

The invention is further described by the following non-limiting examples which further illustrate the invention, and are not intended, nor should they be interpreted, to limit the scope of the invention.

SC-PUDs Used in the Examples

Table 1 provides the details of the self-curing polyurethane dispersions (i.e., SC-PUDs) used in the preparation of aqueous ink compositions suitable for inkjet compositions fulfilling the requirements of the invention. All of the SC-PUDs comprise the co-reagent adipic dihydrazide (ADH; 1:1 molar ratio of SC-PUD to ADH), unless otherwise stated, to effect the cure of prints after drying. All of the SC-PUDs used N,N-dimethylethanolamine as the neutralizing agent (i.e., neutralizing base), other than SC-PUD C, which used triethylamine as the neutralizing base.

TABLE 1

Details of the SC-PUDs used in the Preparation of Aqueous Inks Suitable for Inkjet Printing

| SC-PUD (Inventive or Comparative) | Chain-end Ketone Groups | —OH Groups | pH | Solid Content (% w/w)[1] | Avg. Particle Size (nm) | Hydroxy Value (mgKOH/g); based on dry wt. | Carbonyl (Ketone) Content (mmol/g); based on dry wt.[2] | No. avg. Molecular Weight[3] | Wt. avg. Molecular Weight[4] |
|---|---|---|---|---|---|---|---|---|---|
| 1 (Inv.) | Yes | Yes | 7.6 | 40.1 | 25 | 27 | 0.360 | 5,600 | — |
| A (Comp.) | No | Yes | 7.3 | 40.0 | 30 | 29 | 0 | 5,600 | — |
| B (Inv.) | Yes | No | 7.6 | 40.1 | 41 | 0 | 0.354 | 5,600 | 10,400 |
| B1 (Inv.) (As B, but no ADH) | Yes | No | 7.7 | 39.7 | 40 | 0 | 0.354 | 5,600 | 10,400 |
| C (Inv.) | Yes | Yes | 7.4 | 40.5 | 33 | 27 | 0.356 | 5,600 | — |
| H (Comp.) | No | No | 7.8 | 40.0 | 357 | 0 | 0 | 5,600 | 10,600 |
| I (Inv.) | Yes | No | 8.2 | 39.8 | 129 | 0 | 0.652 | 3,100 | 7,700 |

Notes to Table 1:
[1]The SC-PUDs are aqueous dispersions.
[2]Carbonyl content is calculated from the number of moles of feedstock materials used to manufacture the SC-PUD.
[3]Number average molecular weight for the SC-PUDs was calculated on the basis of the carbonyl (i.e. ketone) content and an assumption that the polymer comprised carbonyl groups at both chain ends. In the case of SC-PUDs A and H these comparative examples were prepared using a chain terminating agent free of any carbonyl groups but otherwise using identical conditions to SC-PUD 1 and hence a theoretical number average molecular weight of 5,600 has been assigned.
[4]Weight average molecular weight for a number of the SC-PUDs was determined by GPC, using a polystyrene calibration and THF as the eluting solvent.

Tests

Viscosity: Viscosity of the inks was measured at 32° C. using a Brookfield DV-II+ Pro Viscometer equipped with Spindle no. 18, at 100 rpm.

Resolubility Testing: Approximately 60 nm ink films were applied to uncoated glass slides using a No. 6 K-Bar applicator (ex. RK Print). The inks were then dried for 30 minutes at 40° C., before being immersed in the "soaking fluid", i.e., an aqueous solution comprising 25% propylene glycol, 0.2% Tegowet KL245 and 0.15% of triethanolamine. This solution is a good simulation of the ink varnish. Resolubility was assessed as: 'Highly Resoluble' (the dried ink film dispersed in the soaking fluid in less than 3 minutes, with no visible signs of any undissolved ink); 'Resoluble' (the dried ink film dispersed in the soaking fluid in 3 to 5 minutes, with no visible signs of any undissolved ink); 'Slowly Resoluble' (the dried ink film dispersed in the soaking fluid within 30 minutes, with no visible signs of any undissolved ink); 'Partially Resoluble' (the dried ink film disperses in the soaking fluid within 30 minutes, with visible signs of undissolved ink); 'Insoluble' (the dried ink film shows little visible evidence of dispersing in the soaking fluid within 30 minutes).

Water Resistance: The water resistance of the prints was determined by rubbing the print with a cotton wool bud soaked in water. The number of double rubs required to remove or disrupt the print was the recorded; this is a test well known in the industry.

Table 2 shows the results for a number of comparative inks suitable for inkjet printing comprising polyurethane and acrylic dispersions not meeting the requirements of the invention. Also included in Table 2 are the results for inks comprising a hydroxy-functional PUD and a polycarbodiimide crosslinker, according to the teaching of US20180105710.

TABLE 2

| | Comparative Ink Examples[1] | | | | | |
|---|---|---|---|---|---|---|
| Ink Example | C1 | C2 | C3 | C4 | C5 | C6 |
| Polymer Dispersion | Neorez R605[2] | Daotan TW7064[3] | Joncryl FLX5000[4] | Daotan 6425[5] | Daotan 6425[5] | Daotan 6425[5] |
| Carbodilite SV-02[6] | — | — | — | — | 2.0 | 4.0 |
| | Ink Properties | | | | | |
| Viscosity (mPa · s) | 5.28 | 5.61 | 6.99 | 5.76 | 6.33 | 6.57 |
| pH | 8.55 | 8.45 | 8.80 | 8.00 | 8.50 | 8.70 |
| Ink Resolubility | Insoluble | Insoluble | Insoluble | Highly Resoluble | Partially Resoluble | Insoluble |
| | Print Properties; Water Resistance (Double Rubs) | | | | | |
| 15 minutes at room temperature | 90 | >100 | >100 | 4 | 10 | 10 |

TABLE 2-continued

| | Comparative Ink Examples[1] | | | | | |
|---|---|---|---|---|---|---|
| Ink Example | C1 | C2 | C3 | C4 | C5 | C6 |
| 2 minutes at 50° C. | >100 | >100 | >100 | 20 | 35 | 40 |
| 2 minutes at 50° C., followed by 24 h. at room temperature | >100 | >100 | >100 | 50 | 80 | 90 |
| 2 minutes at 75° C. | >100 | >100 | >100 | 70 | 90 | >100 |

[1]Composition of inks in Table 2: 19.8% (w/w) deionized water; 25.0% (w/w) propylene glycol; 0.2% (w/w) Tegowet KL245; 30.0% (w/w) of the polymer dispersion; and 25.0% (w/w) of Cyan Pigment Dispersion A, wherein cyan pigment dispersion A is an aqueous pigment dispersion containing 16.7% pigment and around 5% dispersant or other suitable additives. For the examples comprising the polycarbodiimide crosslinker the amount of deionized water in the composition was reduced accordingly.
Note:
this general ink formulation is used for all of the examples in the application.
[2]Neorez R605 is a conventional (i.e., non-self-crosslinking) polyurethane dispersion, with a solid content about 33% and hydroxyl value of less than 5 mgKOH/g (ex. DSM Resins).
[3]Daotan TW7064 is a self-crosslinking, ketone-containing, polyurethane dispersion, with a solid content of about 40% and no ketone (or aldehyde) groups at the polymer chain-ends (ex. Allnex).
[4]Joncryl FLX5000 is a self-crosslinking acrylic dispersion, with a solid content of about 42% (ex. BASF).
[5]Daotan 6425 is a conventional hydroxy-functional polyurethane dispersion, with a solid content of about 40% and a hydroxyl value of about 55 mgKOH/g (ex. Allnex).
[6]Carbodilite SV-02 is a polycarbodiimide crosslinker (ex. Nishinbo Chemicals). The amount of carbodilite used is given as % (w/w).

The results in Table 2 capture the issues that the invention resolves; how to produce aqueous printing inks, especially for inkjet printing, which provide the combination of ink properties (i.e. resolubility) along with print properties (i.e. the capacity to produce prints with good water resistance as demonstrated by double rubs). The conventional polyurethane and acrylic dispersions certainly produce resistant prints but the inks comprising them are highly insoluble. Contrariwise, the OH-PUD Daotan 6425 produces a highly resoluble ink but with poor print resistance. When the polycarbodiimide crosslinker is added to this ink, although there is an improvement in the print resistance, the resolubility is significantly compromised. Furthermore, Comparative Examples C5 and C6 produce prints that do not develop full water resistance after an initial drying of 50° C., followed by a post-cure period of 24 hours at room temperature.

Table 3 shows the results for inks prepared using the SC-PUDs described in Table 1, with SC-PUDs A and H, those without ketone groups as part of their polymeric structure constituting Comparative Examples. The inks were tested in the way previously described. As a further test, the stability of the inks was assessed by storing them for 7 days at 50° C. and remeasuring the viscosity. Instability would present itself typically as an increase in viscosity of greater than 10%. It is common for inks comprising PUDs to show a slight decrease in viscosity.

TABLE 3

| | Inks Comprising SC-PUDs | | | | | | |
|---|---|---|---|---|---|---|---|
| Ink Example | I1 (Inv.) | C7 (Comp.) | I2 (Inv.) | I3 (Inv.) | I4 (Inv.) | C8 (Comp.) | I5 (Inv.) |
| SC-PUD | 1 | A | B | B1 | C | H | I |
| | | | | Ink Properties | | | |
| Viscosity (mPa · s) | 6.78 | 5.82 | 6.00 | 5.82 | 6.63 | 6.24 | 5.52 |
| Viscosity after 1 week storage at 50° C. | 6.36 | 5.58 | 5.97 | 5.58 | 6.36 | 5.94 | 5.10 |
| % Viscosity Change | −6% | −4% | −0.5% | −4% | −4% | −5% | −8% |
| pH | 8.10 | 7.60 | 7.95 | 7.95 | 7.80 | 7.80 | 8.20 |
| Ink Resolubility | Highly Resoluble | Highly Resoluble | Highly Resoluble | Highly Resoluble | Resoluble | Highly Resoluble | Highly Resoluble |
| | | | Print Properties; Water Resistance (Double Rubs) | | | | |
| 15 minutes at room temperature | 10 | 10 | 80 | 10 | 35 | 2 | 30 |
| 2 minutes at 50° C. | 25 | 25 | >100 | 60 | 100 | 25 | >100 |
| 2 minutes at 50° C., followed by 24 h. at room temperature | >100 | 60 | >100 | 90 | >100 | 60 | >100 |
| 2 minutes at 75° C. | >100 | 80 | >100 | >100 | >100 | 90 | >100 |

The results in Table 3 show the benefits of aqueous inks comprising the SC-PUDs. Comparing I1 with C7, and I2 with C8 shows the impact of removing the ketone end group functionality from the SC-PUD on the water resistance of the prints. All the Inventive Examples show an excellent balance of ink resolubility and print resistance especially for those inks comprising SC-PUDs containing the curing co-reagent ADH. It is interesting to note that Example I3, containing a ketone-functional SC-PUD, but without the ADH curative was still able to produce prints with a degree of water resistance, but not to the same level as I2, which is essentially the same SC-PUD but with the ADH curative co-reagent. A further observation is for Ink Example I4 comprising SC-PUD C, which is essentially the same as SC-PUD 1, but where the SC-PUD is neutralized with triethylamine, rather than N,N-dimethylethanolamine. This more volatile neutralizing amine has a slight negative impact on the ink resolubility but enables the print resistance to develop more quickly. This may well be due to the reaction between the ketone end groups of the SC-PUD and ADH being retarded in the presence of the tertiary amine and consequently inks comprising SC-PUDs neutralized with less volatile amines such as N,N-dimethylethanolamine (with a boiling point of 134° C., compared with 89° C. for triethylamine) will cure more slowly. For promoting resolubility a further aspect of the invention is that any neutralizing tertiary amine should preferably have a boiling point of greater than 125° C.

Tests on Textile Fabrics:

The SC-PUD B, having only terminal keto-groups, and no end-chain hydroxyl or acid groups, and the SC-PUD 1, having both terminal hydroxyl groups and keto-groups, were applied to 100% untreated cotton and polyester PKPD8 (R A Smart) using a draw down method with a no. 2 K bar. The polymers were loaded from the K bar using an automatic coating machine. The fabric samples were then dried in a fan oven at 100° C. for 10 minutes to evaporate the water and to enable the fabrics to form bonds with the polymers. The samples were then weighed on an analytical balance and the dry weight recorded before soaking the fabric samples in a 1% w/w solution of Tergitol 15-S-7 in deionized water for a period of 18 hours, with occasional agitation. The fabric samples were then washed with copious amounts of deionized water and then dried in a fan oven at 100° C. for an hour, before weighing again on an analytical balance and the weight recorded. The amount of resin remaining on the fabric and bound firmly was then calculated. The results are shown in Table 4.

As shown in Table 4, the higher weight of retained resin in SC-PUD-B (keto-terminal only SC-PUD) compared to SC-PUD-1 (hydroxyl- and keto-terminal PUD) indicates improved bond between the resin and the fabrics. For both the cotton and polyester fabrics, the SC-PUD-B exhibited improved bonding to the fabrics vs. SC-PUD-1, with the cotton having a cellulosic (hydroxyl active) functionality and polyester which has ester functional surface groups.

Pigment Cyan Ink:

Pigment Dispersions used for cyan inks were a mixture of Pigment 15 with a standard anionic dispersant in water Example 1: Cyan Ink Cyan Ink Set 1 (SC-PUD B): To a mechanically stirred tank or vessel using a saw tooth impellar is added 15.82 g of the cyan dispersion (above); followed by deionised water, 28.16 g; propylene glycol, 28.76 kg; diethylene glycol, 7.79 g; SC-PUD type B 17.59 g; TegoWet 270, 0.56 g, Surfynol 355, 1.04 g, Surfynol 465, 0.06 g, and a solution of 25% w/w triethanolamine in water, 0.23 g. The mixture was stirred for a further 1 hour at ambient temperature and then the mixture filtered through a Whatman GF/B glass fibre filter depth filter. The physical properties of the ink were measured to give a viscosity of 5.57 cP (measured at 32° C. at low shear (i.e., 60 rpm) using a Brookfield DV-II+ Viscometer); dynamic surface tension (measured using a SITA bubble pressure tensiometer): 36.9 $mNm^{-1}$ (measured at 25° C. and 11 Hz), 33.4 $mNm^{-1}$ (measured at 25° C. and 2.7 Hz), 27.7 $mNm^{-1}$ (measured at 25° C. and 0.1 Hz), 26.2 $mNm^{-1}$ (measured at 25° C. and 0.025 Hz); particle size Z-average 127 nm, Dv50 110 nm, Dv90 264 nm, polydispersity 0.215 (measured using a Malvern Zetasizer Nano-S).

Inkjet Printing

The ink(s) prepared above were loaded to a Dimatix DMP2800 printer and printed at various drop spacings (21 microns, 26 microns, 31 microns and 36 microns) onto either FKPD8 polyester (R A Smart) or untreated 100% cotton. After printing a solid block of colour the printed textile fabrics were dried in a fan assisted laboratory oven at 100° C. for 10 minutes. The colour properties of the FKPD8 polyester printed substrates were then measured using an X-rite i7 spectrometer fitted with a 10 mm port using a 10 mm reflectance template. This gave the pre-wash colour property information.

Wash Test

To simulate washfastness, the printed fabrics were then allowed to soak, fully immersed, in a 1% w/w solution of

TABLE 4

| Fabric | SC-PUD | Functionality | Weight of fabric/g (Before Coating) | Weight of fabric + resin film | | Weight on fabric | Weight after soak | Weight Lost | % Retained |
|---|---|---|---|---|---|---|---|---|---|
| | | | | After drying, before soaking | After soaking and drying | | | | |
| FKPD8 Polyester | B | Keto-end groups, no hydroxyl end groups | 1.9516 | 2.4737 | 2.1628 | 0.5221 | 0.2112 | 0.3109 | 40% |
| | 1 | Hydroxyl & keto end-groups | 2.6347 | 3.2282 | 2.8385 | 0.5935 | 0.2038 | 0.3897 | 34% |
| 100% Cotton | B | Keto-end groups, no hydroxyl end groups | 2.5105 | 2.8093 | 2.6385 | 0.2988 | 0.128 | 0.1708 | 43% |
| | 1 | Hydroxyl & keto end-groups | 3.2077 | 3.9593 | 3.4034 | 0.7516 | 0.1957 | 0.5559 | 26% |

Tergitol 15-S-7 in deionised water for a period of 2 hours at room temperature with occasional agitation. The printed fabrics were then rinsed with deionised water to remove the surfactant and then dried in a fan oven to remove residual water at 100° C. for a period of 10 minutes. For the polyester fabric, colour measurements were taken using an X-rite i7 spectrometer fitted with a 10 mm port using a 10 mm reflectance template. This gave the post-wash colour property information shown in Table 5. For the purposes of the present test, a general industry standard of a Delta E≤3.00 was considered a good result, indicating that the ink is bound well to the fabric. It should be noted that for some applications, a Delta of >3.00 is acceptable, including for example >4.00 or >5.00 depending on the type of fabric and the way in which the surface functional groups and fibers align and their propensity to absorb and reflect incident light used in color measurement methods depending on orientation of the fibers For the cotton fabric, the taking of L a*b* readings is not practical due to the fibrous nature of cotton fabrics, which skews the readings. In the case of the cotton, a visual inspection of the wash liquids was performed, with the desired result being no visible evidence of colour in the wash liquid (i.e. the wash liquid remains "water white"), which indicates excellent binding of ink and fabric. Both the cotton and polyester samples were visually inspected and showed no evidence of colour in the wash liquids.

TABLE 5

Colorimetric Data

| Fabric | Drop Spacing (Microns) | Pre-Washing | | | Post-Washing | | | Delta E |
|---|---|---|---|---|---|---|---|---|
| | | L | a* | b* | L | a* | b* | |
| Polyester FKPD8 | 21 | 51.45 | −13.96 | −38.5 | 53.85 | −14.68 | −37.09 | 2.88 |
| | 26 | 55.28 | −16.02 | −39.22 | 57.27 | −16.46 | −37.94 | 2.41 |
| | 31 | 57.96 | −17.52 | −38.68 | 60.08 | −17.83 | −37.32 | 2.54 |
| | 36 | 62.08 | −18.52 | −37.35 | 63.24 | −19.27 | −36.63 | 1.56 |

Hand

In most cases, where polymer binders are used, the "hand" or feel of the fabric when touched is changed after printing. The benefit of the present invention is that even with low levels of SC-PUDs in the inks, the binding is very effective to the fabric which prevents a change to the hand of the fabrics. In the present invention, the cyan ink printed and cured onto polyester and cotton 100% (as described in the Inkjet Printing method above) exhibited no discernible change in the texture, feel, flexibility or crease resistance of the fabrics as measured by hand. Furthermore, there was no cracking or change in the printed fabrics on creasing, stretching or malformation (i.e. the printed fabrics retain the feel of the virgin, unprinted fabrics).

The invention claimed is:

1. A method for providing a printed article, comprising printing an aqueous ink composition onto a fibrous substrate and curing the ink, wherein the ink composition comprises a polyurethane dispersion having the properties of (a) ketone or aldehyde groups present at one or more polymer chain ends; (b) a number average molecular weight ≤50,000 and; (c) the content of ketone and aldehyde groups is in the range 0.02 to 4.0 mmol $g^{-1}$, based on the dry polymer weight.

2. The method of claim 1, wherein the groups present at one or more polymer chain ends are ketone groups.

3. The method of claim 2, wherein the polyurethane dispersion has a number average molecular weight ≤25,000.

4. The method of claim 3, wherein the polyurethane is predominantly linear in structure and the average number of ketone and aldehyde groups on the polymer is two or less.

5. The method of claim 4, wherein the polyurethane dispersion further comprises a reagent that may react with the ketone or aldehyde groups on the polymer chain end to cure the composition.

6. The method of claim 5 wherein curing occurs via linear chain extension.

7. The method of claim 6, wherein the substrate is selected from the group consisting of cotton, rayon, silk, polyester, PET (Polyethylene terephthalate), viscose, nylon, polyamide, canvas, cashmere, chenille, chiffon, crepe, damask, georgette, gingham, jersey, lace, linen, polyvinyl chloride, leather, merino wool, modal, muslin, organza, wood, satin, spandex, suede, taffeta, toile, tweed, twill, velvet, wallpaper and combinations thereof.

8. The method of claim 7, wherein the substrate is selected from cotton, polyester, polyamide and combinations thereof.

9. The method of claim 8, wherein printing is by inkjet printing.

10. The method of claim 9, wherein the substrates do not contain a chemical primer or chemical pre-treatment layer.

11. The method of claim 10, wherein the ink is printed onto a base coat of a white or other colored pigment or dye.

12. The method of claim 11, wherein the printing ink is subsequently overprinted with a topcoat.

13. The method of claim 12, wherein the ink is cured using a near infrared (NIR) lamp or infrared lamp.

14. The method of claim 12, wherein the ink is cured using a thermal method at between 30-250° C.

15. The method of claim 12, wherein the ink is cured using an airflow method.

16. The method of claim 9, comprising an inkjet printing head selected from the group consisting of thermal, drop-on-demand, continuous and MEMs.

17. A printed image or article resulting from the method of claim 1.

\* \* \* \* \*